(12) United States Patent
Bhosale et al.

(10) Patent No.: US 8,878,877 B2
(45) Date of Patent: Nov. 4, 2014

(54) RESCALING FOR INTEROPERABILITY IN VIRTUAL ENVIRONMENTS

(75) Inventors: Deepti K. Bhosale, Pune (IN); Peter G. Finn, Brampton (CA); Salil P. Gandhi, Pune (IN); Nilesh K. Mahajan, Stonybrook, NY (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/958,119

(22) Filed: Dec. 1, 2010

(65) Prior Publication Data
US 2011/0164059 A1 Jul. 7, 2011

(30) Foreign Application Priority Data

Dec. 3, 2009 (CA) ..................................... 2686991

(51) Int. Cl.
*G09G 5/00* (2006.01)
*G06T 15/00* (2011.01)
*G06T 1/00* (2006.01)
*A63F 13/40* (2014.01)

(52) U.S. Cl.
CPC . *A63F 13/10* (2013.01); *G06T 1/00* (2013.01); *A63F 2300/5553* (2013.01)
USPC ............................. 345/660; 345/419; 345/666

(58) Field of Classification Search
CPC ........................... G06T 3/40; A63F 2300/5553
USPC .......................................... 345/419, 660–666
See application file for complete search history.

(56) References Cited

U.S. PATENT DOCUMENTS

| | | | |
|---|---|---|---|
| 6,559,870 B1 * | 5/2003 | Anabuki et al. | 715/849 |
| 2004/0233461 A1 * | 11/2004 | Armstrong et al. | 356/620 |
| 2006/0061568 A1 * | 3/2006 | Gallery et al. | 345/419 |
| 2009/0037905 A1 | 2/2009 | Hamilton, II et al. | |
| 2009/0119764 A1 | 5/2009 | Applewhite et al. | |

OTHER PUBLICATIONS

Unknown, "Draft Requirements for MPEG-V," International Organization for Standardization Organisation Internationale Normalisation, ISO/IEC JTC 1/SC 29/WG 11, Coding of Moving Pictures and Audio, ISO/IEC JTC 1/SC 29/WG 11/N9902, Archamps, France, May, 2008.

* cited by examiner

*Primary Examiner* — Xiao Wu
*Assistant Examiner* — Matthew D Salvucci
(74) *Attorney, Agent, or Firm* — Penny L. Lowry; Grant Johnson (57) ABSTRACT

Exemplary embodiments include a method for transferring objects from a first virtual environment residing on a first computer system to a second virtual environment residing on a second computer system, the method including determining whether dimensions of the second virtual environment are compatible with dimensions of the first virtual environment, in response to a determination that the dimensions of the second virtual environment are not compatible with the dimensions of the first virtual environment, performing an interoperability rescaling between the first virtual environment and the second virtual environment and transferring the object from the first virtual environment to the second virtual environment.

6 Claims, 11 Drawing Sheets

RESCALING FOR INTEROPERABILITY IN VIRTUAL ENVIRONMENTS

BACKGROUND

The present invention relates to virtual world environments, and more specifically, to systems and methods for rescaling objects for interoperability in 3D virtual environments.

A virtual world is a computer-based simulated environment in which computer users (players) inhabit and interact via avatars. An avatar is a computer user's representation of himself/herself or alter ego (e.g., a three-dimensional graphical representation or model within the virtual world). The computer accesses a computer-simulated environment and presents perceptual stimuli to the user, who in turn can manipulate elements of the modeled world. The model world may simulate rules based on the real world or some hybrid fantasy world. A player's avatar can travel between buildings, towns, and even worlds to carry out business or leisure activities, and interact with other players via their avatar. A well-known virtual environment is Second Life®, which launched in 2003 and currently includes millions of worldwide residents. Currently, each virtual environment, and their respective avatars, are distinct and separate from and do not interact with other virtual environments. As such, there is currently no interoperability between virtual environments. Interoperability refers to the ability for a character (avatar) in one virtual world system to be able to transfer between and interact with another virtual environment, and to carry with it certain attributes and capabilities. As such, currently there is no ability to seamlessly travel from one virtual environment to another environment.

SUMMARY

Exemplary embodiments include a method for transferring an avatar from a first virtual environment residing on a first computer system to a second virtual environment residing on a second computer system, the method including determining whether dimensions of the second virtual environment are compatible with dimensions of the first virtual environment, in response to a determination that the dimensions of the second virtual environment are not compatible with the dimensions of the first virtual environment, performing an interoperability rescaling between the first virtual environment and the second virtual environment and transferring the avatar from the first virtual environment to the second virtual environment.

Additional exemplary embodiments include a computer program product for transferring an avatar from a first virtual environment residing on a first computer system to a second virtual environment residing on a second computer system, the computer program product including computer readable medium having instructions stored thereon for causing the first and second computer systems to implement a method, the method including determining whether dimensions of the second virtual environment are compatible with dimensions of the first virtual environment, in response to a determination that the dimensions of the second virtual world are not compatible with the dimensions of the first virtual environment, performing an interoperability rescaling between the first virtual environment and the second virtual environment and transferring the avatar from the first virtual environment to the second virtual environment.

Further exemplary embodiments include a system for transferring an avatar from a first virtual world residing on a first computer system to a second virtual world residing on a second computer system, the system including a processor, a data structure including dimension compatibility between the first virtual environment and the second virtual environment, and processor executable instructions for carrying out the steps of: determining whether dimensions of the second virtual environment are compatible with dimensions of the first virtual environment, in response to a determination that the dimensions of the second virtual environment are not compatible with the dimensions of the first virtual environment, performing an interoperability rescaling between the first virtual environment and the second virtual environment, and transferring the avatar from the first virtual environment to the second virtual environment.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein rescale virtual objects, such as avatars, trophies, souvenirs, mementoes, and the like (collectively "avatars"), for interoperability between virtual environments ("worlds"), thereby allowing the avatar and/or objects to be transferred between the normally separate, distinct virtual worlds. As such, trans-world commerce between multiple, participating virtual environments can occur. The systems and methods described herein enable size adjustments relative to the virtual worlds' environments as the avatars and objects in virtual world A move into virtual world B. Exemplary embodiments scale the avatars and objects and the environment relatively compatible with each other, whenever an avatar or object transfers from one virtual world to another. When an avatar or object enters an environment, the height and size of the avatar or object in comparison to the environment may not be sync because the avatar or object has moved from virtual world A to virtual world B and so adjustments are made. For illustrative purposes, the height of the avatar is discussed with respect to the various exemplary embodiments. It is appreciated that other dimensions or features, such as the width or entire scale of the 3D object, are contemplated in other exemplary embodiments.

In exemplary embodiments, the systems and methods described herein can rescale an avatar implementing tagged common objects as a base for identifying scale factor. As such resizing an avatar in a 3D virtual world environment may be based on the scale of the objects within the space of the virtual world environment. This implementation includes reviewing the size and scale of the room and automatically modifying the height of the avatar in accordance with its surroundings. Various common stationary objects, such as a chair, table, door, automobile and the like can be tagged. The height of the tagged object in one virtual world (i.e., a source) is compared to another virtual world (i.e., a destination), which determines a scaling factor. According to the scaling factor and the height of the avatar in virtual world A is used to the height of the avatar in virtual world B. It is appreciated that the item that is tagged can have an associated record or data structure that stores the dimension information. This record or data structure is therefore accessible to generate the scaling factor. The scales may be different in different virtual worlds. For example, if an avatar teleports from Virtual World A to Virtual World B, the scales from the records are compared. There are various common objects that can be tagged in both the virtual worlds. There can be objects created that are smaller/larger in size than the standard size for that particular objects, are not tagged. Only standard objects are tagged. As such, standard objects can be identified for all virtual worlds and records can be accordingly created and stored for access to generate the scaling factors. The size difference between one virtual world tagged object is compared with another similarly tagged object in the destination virtual world and the scaling ratio is identified.

Figure 1:
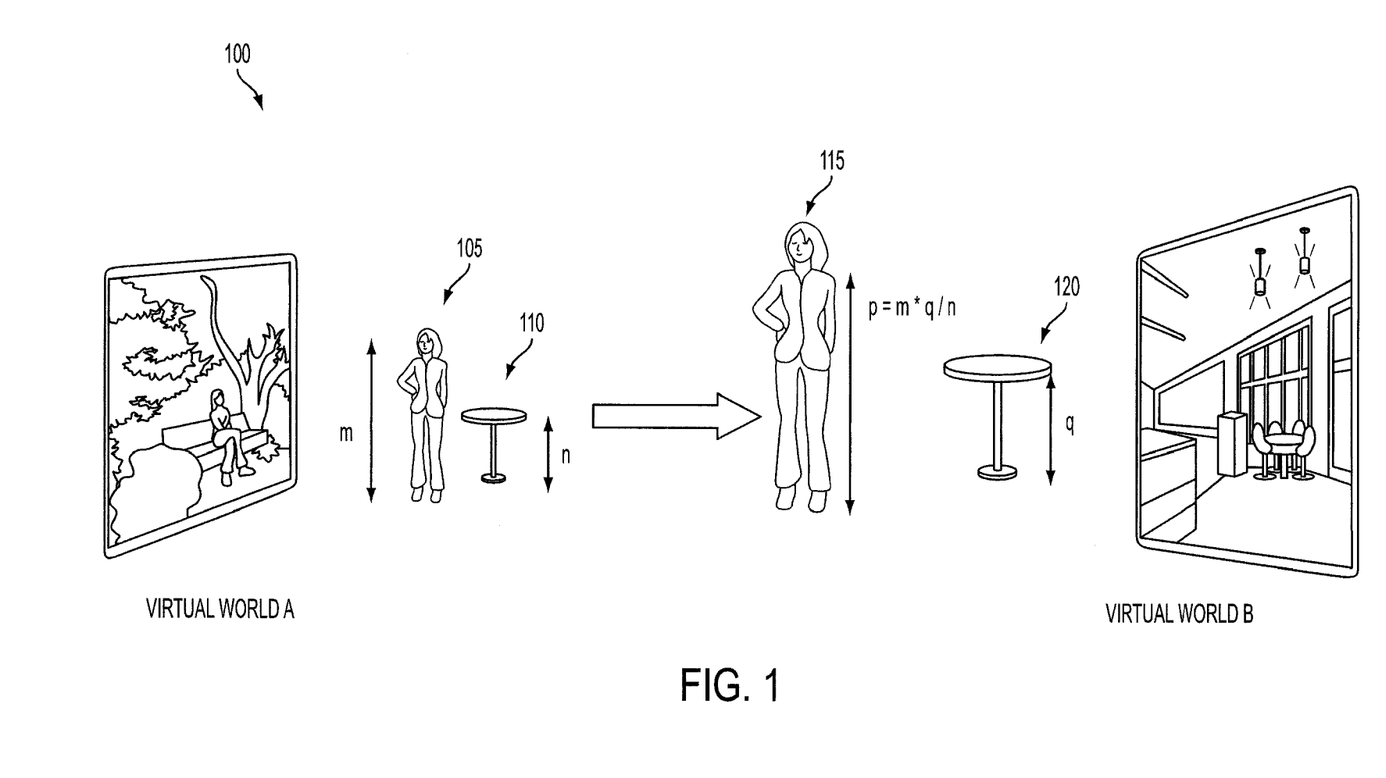
FIG. 1 diagrammatically illustrates an example for rescaling an avatar implementing tagged common objects as a base for identifying scale factor.
Figure 2:
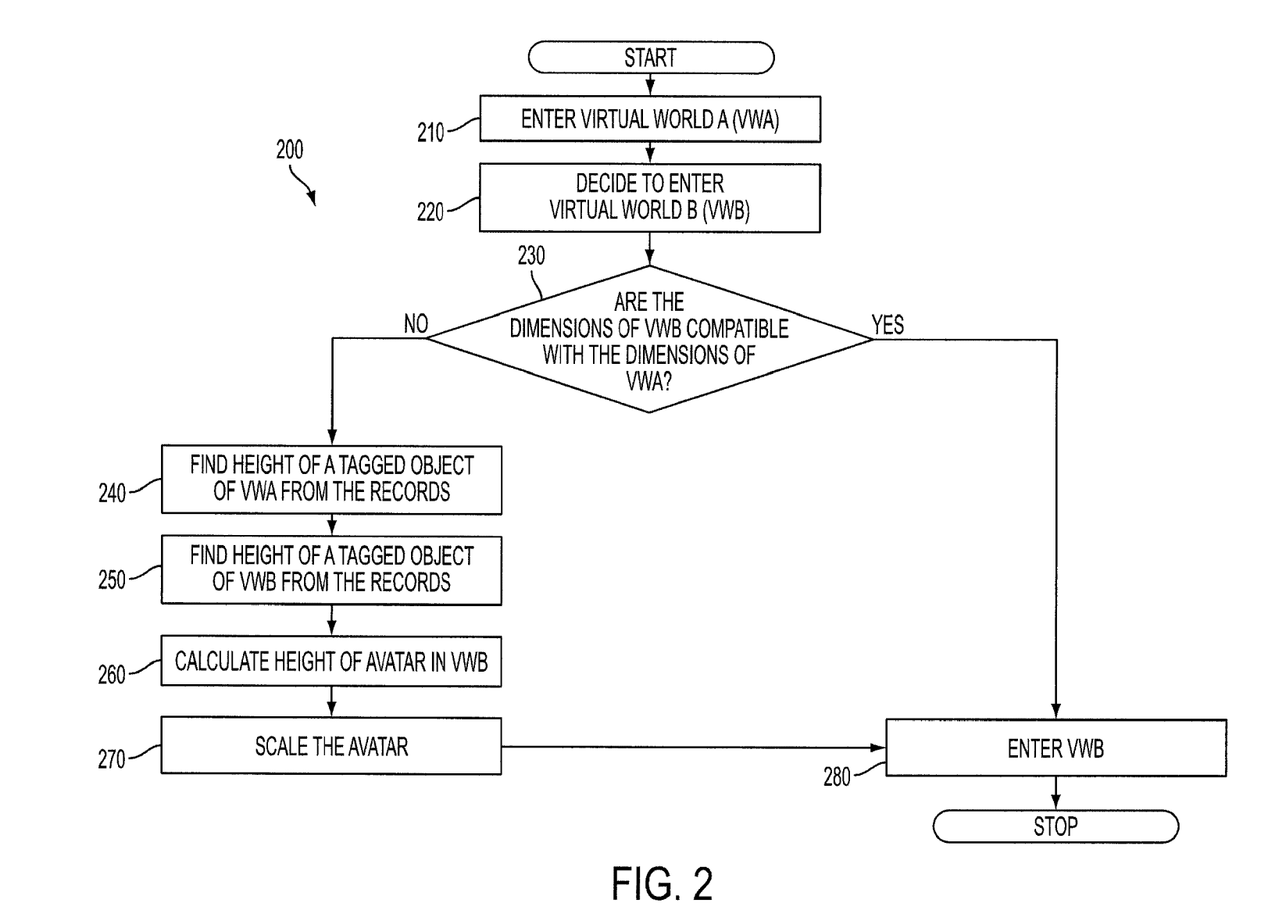
FIG. 2 illustrates a flowchart of a method for rescaling an avatar implementing tagged common objects as a base for identifying scale factor in accordance with exemplary embodiments.

FIG. 1 diagrammatically illustrates an example 100 for rescaling an avatar implementing tagged common objects as a base for identifying scale factor. FIG. 2 illustrates a flowchart of a method 200 for rescaling an avatar implementing tagged common objects as a base for identifying scale factor in accordance with exemplary embodiments. FIG. 1 illustrates an original avatar 105 in Virtual World A (VWA), with height m, and a scaled avatar 115 in Virtual World B (VWB), with height p, after teleporting between VWA and VWB. FIG. 1 further illustrates a first tagged object (e.g., a table) 110 in VWA, with height n and a second tagged object in VWB, with height q. According to FIG. 2, a user causes the original avatar 105 to enter VWA at block 210. The user then decides to have the user's original avatar 105 transport to VWB at block 220. The method 200 then determines if the dimensions of VWB are compatible with the dimensions of VWA at block 230. If the dimensions of VWA and VWB are compatible at block 230, then at block 280, the original avatar 105 enters VWB. In this case there is no scaling and the original avatar 105 remains its original height. In exemplary embodiments, the virtual worlds may include a data structure having a predetermined record that the virtual worlds are compatible for non-scaled teleportation. However, if the method 200 determines that the dimensions of VWA and VWB are not compatible at block 230, then scaling is implemented on the original avatar 105 in accordance with exemplary embodiments. In the example 100 of FIG. 1, the height, n, of the first tagged object 110 is identified in VWA from the records at block 230. In addition, the height, q, of the second tagged object 120 is identified in VWB from the records. Then at block 260, the scaled height p of the scaled avatar 115 is calculated at block 260. In exemplary embodiments, the scaled height is calculated as follows: $p=m*(q/n)$. As such, the ratio of the tagged objects 110, 120 determines the scaling factor/ratio (q/n). At block 270, the original avatar 105 is scaled according to the calculation at block 260 and scaled to the scaled avatar 115 for entry into VWB. At block 280, the original avatar 105 enters VWB as the scaled avatar 115.

In exemplary embodiments, the systems and methods described herein can rescale a virtual world environment implementing tagged common objects as a base for identifying scale factor. As such, automatic scaling of objects in a virtual world can be based on their real world counterparts. This implementation includes reviewing the size and scale of the room and automatically modifying the objects and size of the room to fit the size of the avatar. In this implementation, the common objects are tagged. The scaling ratios are determined by comparing the objects in both the virtual worlds, using a similar methodology as described above. However, in this embodiment, the room and all the surrounding objects in the destination virtual world are scaled, instead of scaling the original avatar itself.

Figure 3:
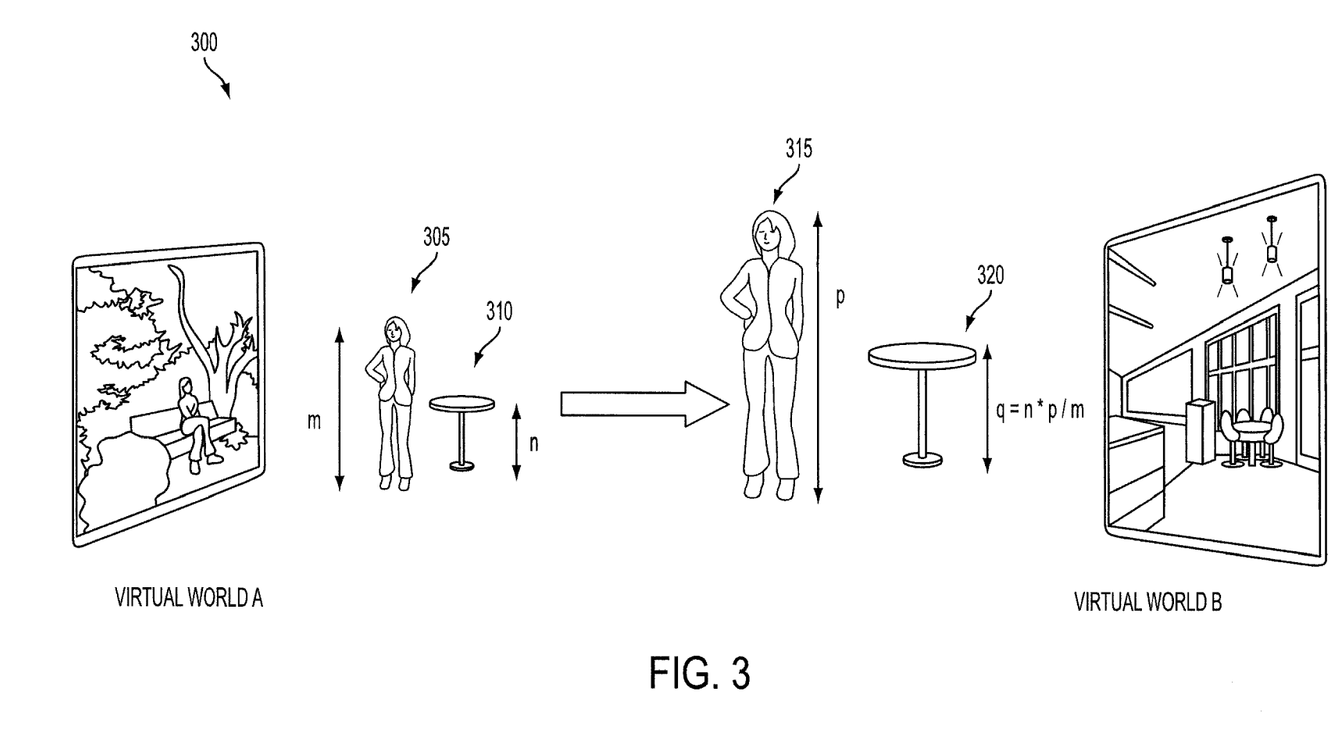
FIG. 3 diagrammatically illustrates an example for rescaling the virtual world environment implementing tagged common objects as a base for identifying scale factor.
Figure 4:
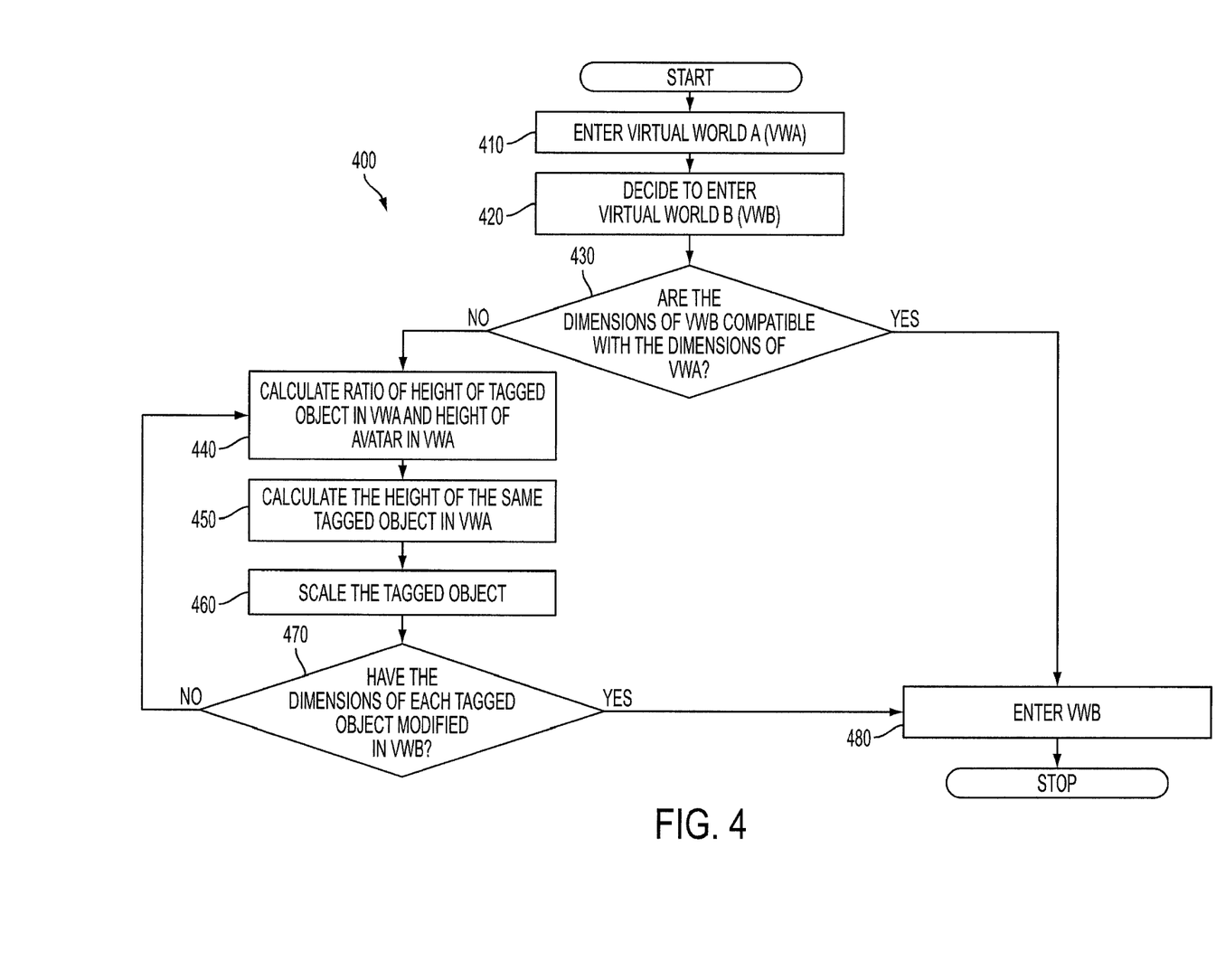
FIG. 4 illustrates a flowchart of a method for rescaling the virtual world environment implementing tagged common objects as a base for identifying scale factor in accordance with exemplary embodiments.

FIG. 3 diagrammatically illustrates an example 300 for rescaling the virtual world environment implementing tagged common objects as a base for identifying scale factor. FIG. 4 illustrates a flowchart of a method 400 for rescaling the virtual world environment implementing tagged common objects as a base for identifying scale factor in accordance with exemplary embodiments. FIG. 3 illustrates an original avatar 305 in VWA, with height m, and a teleported avatar 315 in VWB, with height p, after teleporting between VWA and VWB. FIG. 3 further illustrates a first tagged object (e.g., a table) 310 in VWA, with height n and a second tagged object in VWB, with height q. According to FIG. 4, a user causes the original avatar 305 to enter VWA at block 410. The user then decides to have the user's original avatar 305 transport to VWB at block 420. The method 400 then determines if the dimensions of VWB are compatible with the dimensions of VWA at block 430. If the dimensions of VWA and VWB are compatible at block 430, then at block 480, the original avatar 305 enters VWB. In this case there is no scaling and the original avatar 305 remains its original height and no other scaling is performed in the virtual world environment. In exemplary embodiments, the virtual worlds may include a data structure having a predetermined record that the virtual worlds are compatible for non-scaled teleportation. However, if the method 400 determines that the dimensions of VWA and VWB are not compatible at block 430, then scaling is implemented in the environment of VWB in accordance with exemplary embodiments. At block 440, the method 400 calculated the ratio if the height, n, of the tagged object 310 in VWA and the height, m, of the original avatar 305 in VWA (i.e., (n/m)). At block 450, the method 400 calculated the height of the same tagged object in VWB. In exemplary embodiments, the height of the tagged object in VWB is calculated as follows: $q=p*(n/m)$. At block 460, the original tagged object 310 is scaled according to the calculation at block 450 for entry into VWB. At block 470, the method 400 determines whether the dimensions of all tagged objects in VWB have been modified. If all dimensions of the tagged objects have not been modified at block 470, then the method 400 repeats at block 440. If all dimensions of the tagged objects have been modified at block 470, then at block 480, the original avatar 305 enters VWB with the height p of the scaled avatar 315.

In exemplary embodiments, the systems and methods described herein can rescale an avatar depending upon the average size of avatars in both virtual world spaces. As such, the avatars can be scaled based on other avatars. An average height of all avatars in a source virtual world can be determined determined. For the particular avatar, that is teleporting, the ratio of its height to the average height is determined. Similarly, the average height of avatars in the destination virtual world is determined. With this information, the scaling factor can be determined. This factor can be used to scale and render the avatar in a destination virtual world environment.

Figure 5:
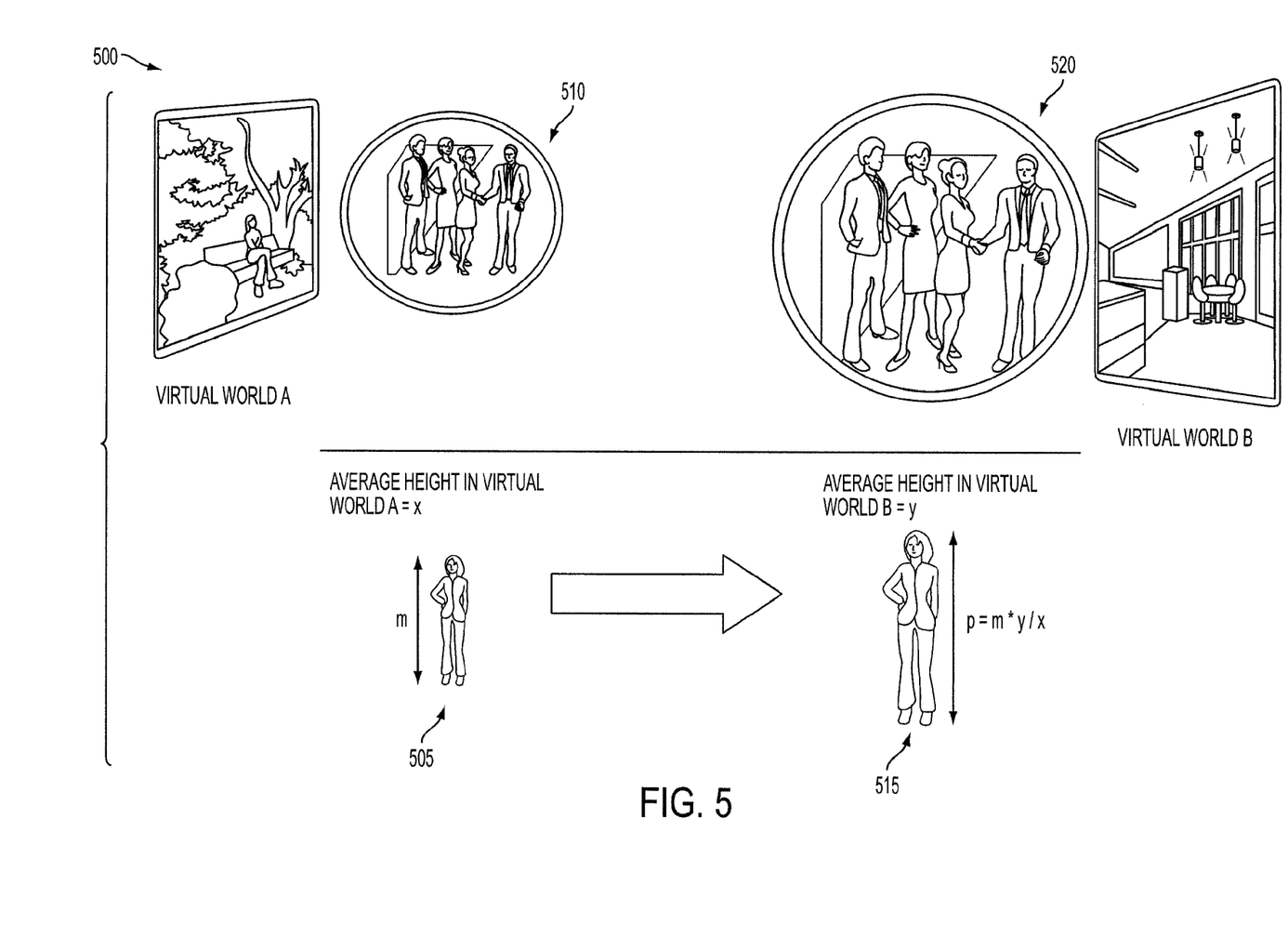
FIG. 5 diagrammatically illustrates an example for rescaling an avatar depending upon the average size of avatars in both virtual world spaces.
Figure 6:
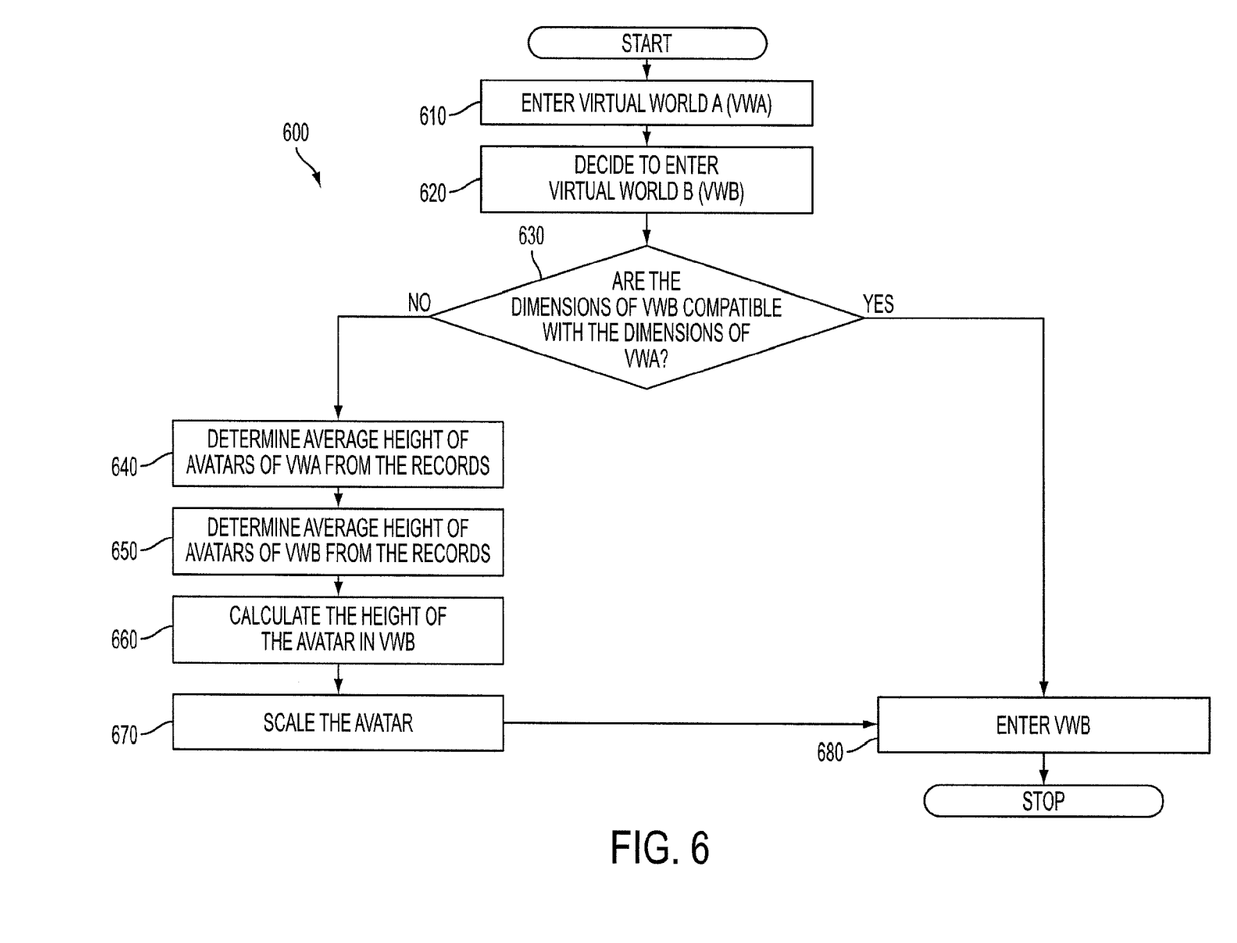
FIG. 6 illustrates a flowchart of a method for rescaling an avatar depending upon the average size of avatars in both virtual world spaces in accordance with exemplary embodiments.

FIG. 5 diagrammatically illustrates an example 500 for rescaling an avatar depending upon the average size of avatars in both virtual world spaces. FIG. 6 illustrates a flowchart of a method 600 for rescaling an avatar depending upon the average size of avatars in both virtual world spaces in accordance with exemplary embodiments. FIG. 5 illustrates an original avatar 505 in VWA, with height m, and a scaled avatar 115 in VWB, with height p, after teleporting between VWA and VWB. FIG. 5 further illustrates a group of VWA avatars 510 in VWA, representing an average height, x, in VWA, and s a group of VWB avatars 520 in VWB, representing an average height, y, in VWB. According to FIG. 6, a user causes the original avatar 505 to enter VWA at block 610. The user then decides to have the user's original avatar 505 transport to VWB at block 620. The method 600 then determines if the dimensions of VWB are compatible with the dimensions of VWA at block 630. If the dimensions of VWA and VWB are compatible at block 630, then at block 680, the original avatar 505 enters VWB. In this case there is no scaling and the original avatar 505 remains its original height. In exemplary embodiments, the virtual worlds may include a data structure having a predetermined record that the virtual worlds are compatible for non-scaled teleportation. However, if the method 600 determines that the dimensions of VWA and VWB are not compatible at block 630, then scaling is implemented on the original avatar 505 in accordance with exemplary embodiments. In the example 500 of FIG. 5, the average height, x, of the group of VWA avatars 510 is identified in VWA from the records at block 640. In addition, the average height, y, of the group of VWB avatars 520 is identified in VWB from the records at block 650. Then at block 660, the scaled height p of the scaled avatar 515 is calculated at block 660. In exemplary embodiments, the scaled height is calculated as follows: $p=m*(y/x)$. As such, the ratio of the average heights 510, 520 determines the scaling factor/ratio (y/x). At block 670, the original avatar 505 is scaled according to the calculation at block 660 and scaled to the scaled avatar 515 for entry into VWB. At block 680, the original avatar 505 enters VWB as the scaled avatar 515.

In exemplary embodiments, the systems and methods described herein can rescale an avatar based upon a standard scale. As such, the systems and methods described herein can define a standard scale for scaling avatars between virtual worlds. In exemplary embodiments, the scaling in a particular virtual world can be compared to a standard scaling and a scaling factor for that virtual world can be determined. Using the scaling factors, for virtual worlds mapped to the standard scale, the scaling ratio can be determined when an avatar teleports from one virtual world to another. As such, if avatars from, for example, virtual worlds A, B and C, all are teleporting to virtual world D, then the scaling ratio of virtual world D compared to the standard scale can be used to find the ratio. In this implementation, various virtual world owners can determine the standard scale. In addition, the owners can define a mapping for the standard scale with the scale used in various virtual worlds. Using this mapping one can derive the scaling factor while teleporting from a particular virtual world to another. The two virtual worlds (i.e., source and destination) interact with each other in terms of the standard scales and hide the implementation details for its scaling.

Figure 7:
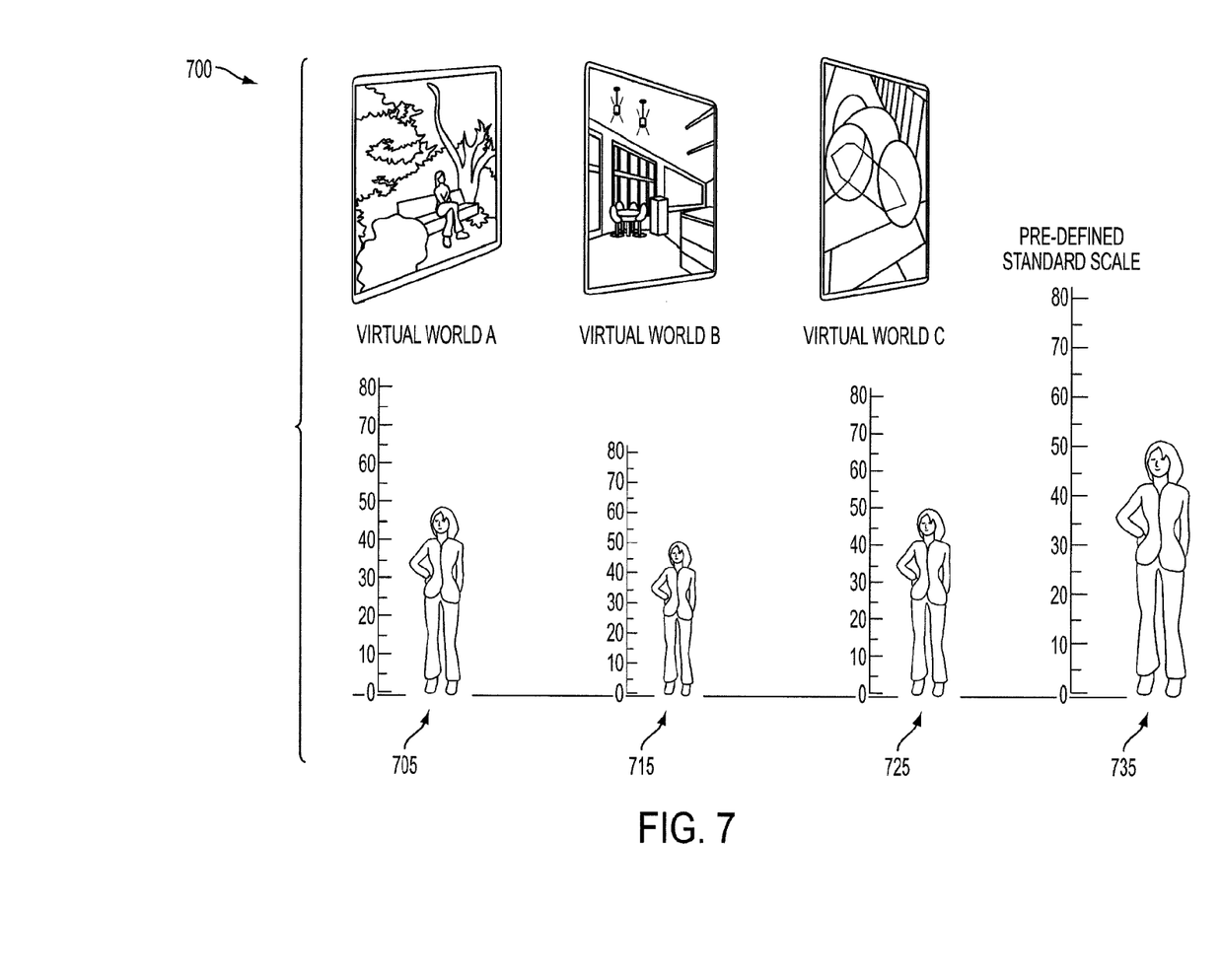
FIG. 7 diagrammatically illustrates an example for rescaling an avatar based upon a standard scale.
Figure 8:
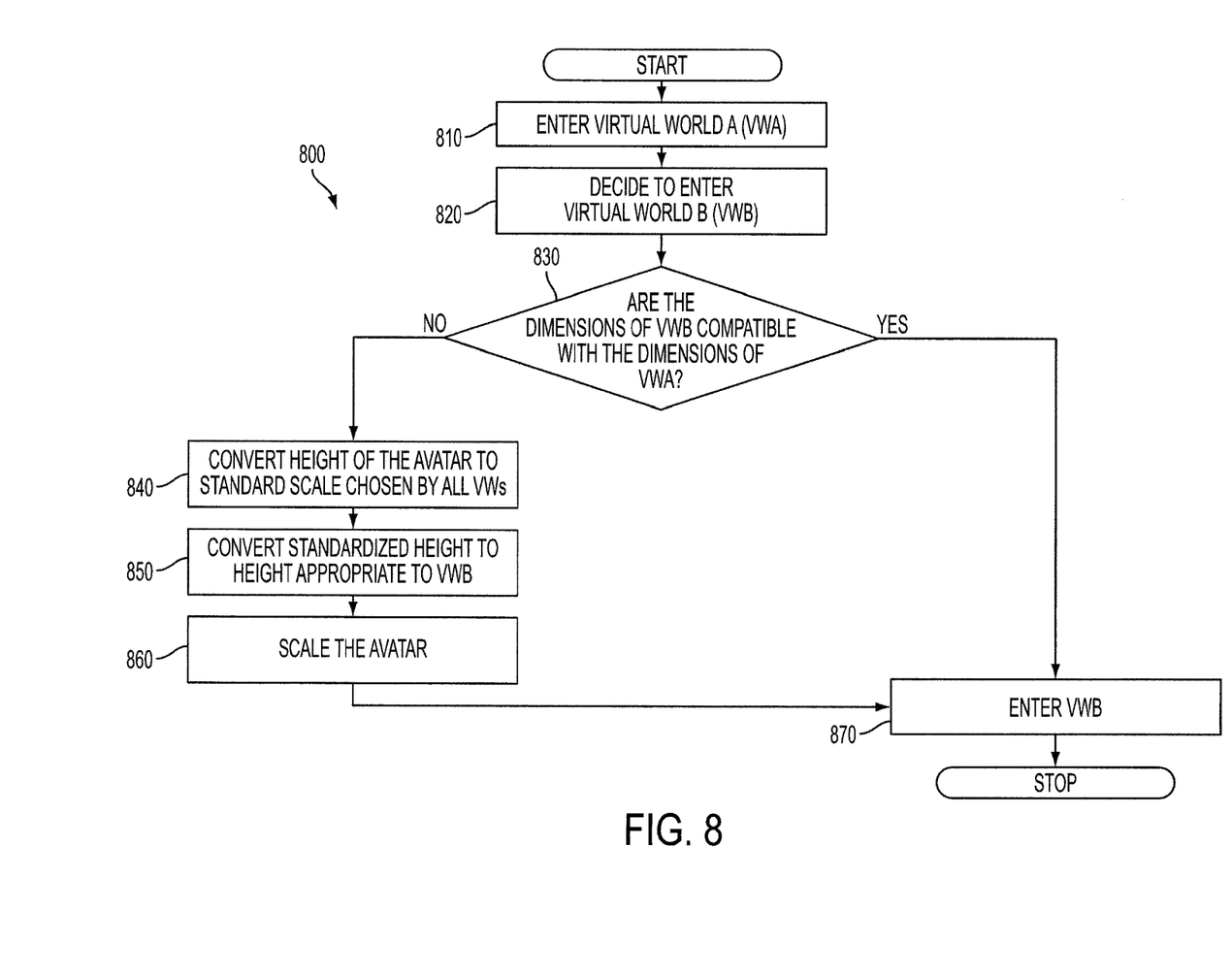
FIG. 8 illustrates a flowchart of a method for rescaling an avatar based upon a standard scale in accordance with exemplary embodiments.

FIG. 7 diagrammatically illustrates an example 700 for rescaling an avatar based upon a standard scale. FIG. 8 illustrates a flowchart of a method 800 for rescaling an avatar based upon a standard scale in accordance with exemplary embodiments. FIG. 7 illustrates an original avatar 705 in VWA, an original avatar 715 in VWB, an original avatar 725 in Virtual World C (VWC), and a pre-defined standard scale avatar 735. For illustrative purposes, the example discusses the entry of the original avatar 715 in VWA entering into VWB. According to FIG. 8, a user causes the original avatar 705 to enter VWA at block 810. The user then decides to have the user's original avatar 705 transport to VWB at block 820. The method 800 then determines if the dimensions of VWB are compatible with the dimensions of VWA at block 830. If the dimensions of VWA and VWB are compatible at block 830, then at block 870, the original avatar 705 enters VWB. In this case there is no scaling and the original avatar 705 remains its original height. In exemplary embodiments, the virtual worlds may include a data structure having a predetermined record that the virtual worlds are compatible for non-scaled teleportation, which can be the same record that includes the standard scaling information for virtual worlds. However, if the method 800 determines that the dimensions of VWA and VWB are not compatible at block 830, then scaling is implemented on the original avatar 705 in accordance with exemplary embodiments. At block 840, the method 800 converts the height of the original avatar 705 in VWA to the standard scale chosen by all virtual worlds. This standard scale is seen, for example, with the pre-defined standard scale avatar 735 in FIG. 7. At block 850, the method then converts the standardized height to the height appropriate to VWB, for example to the scaled avatar 715 in FIG. 7. At block 860, the original avatar 705 is scaled according to the conversions at blocks 840 and 850 for entry into VWB. At block 870, the original avatar 705 enters VWB as the scaled avatar 715.

In exemplary embodiments, the systems and methods described herein can scale an avatar based upon real world counterparts. As such rescaling can be achieved by automatic scaling of objects and avatars in a virtual world based on their physical real world counterparts. In these embodiments, when a new object or avatar is added to a virtual world and the object or avatar does not fit to scale with the rest of the environment, all objects are automatically base lined to conform to the same scale as their real world counterparts.

Figure 9:
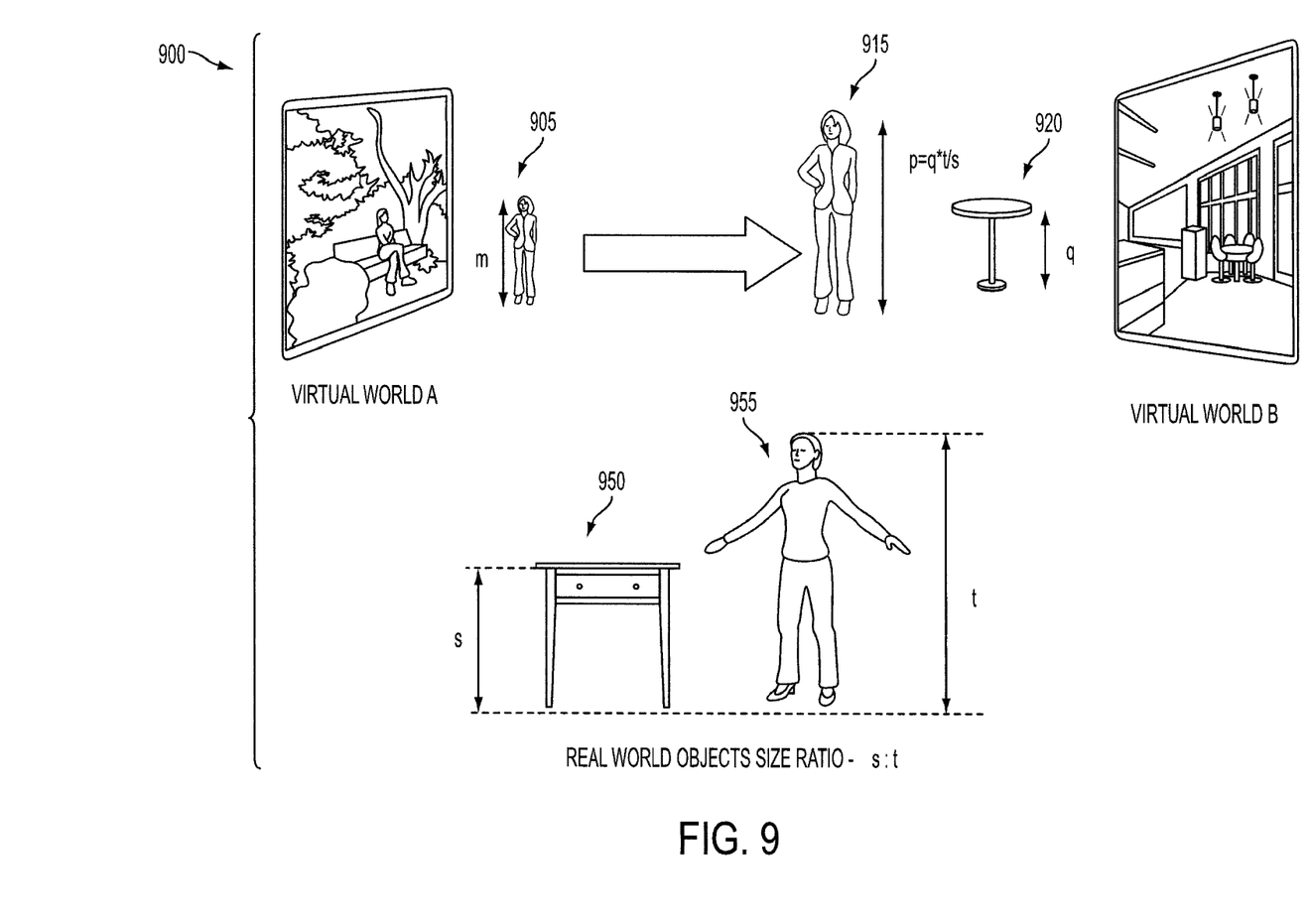
FIG. 9 diagrammatically illustrates an example for rescaling an avatar based upon real world counterparts.
Figure 10:
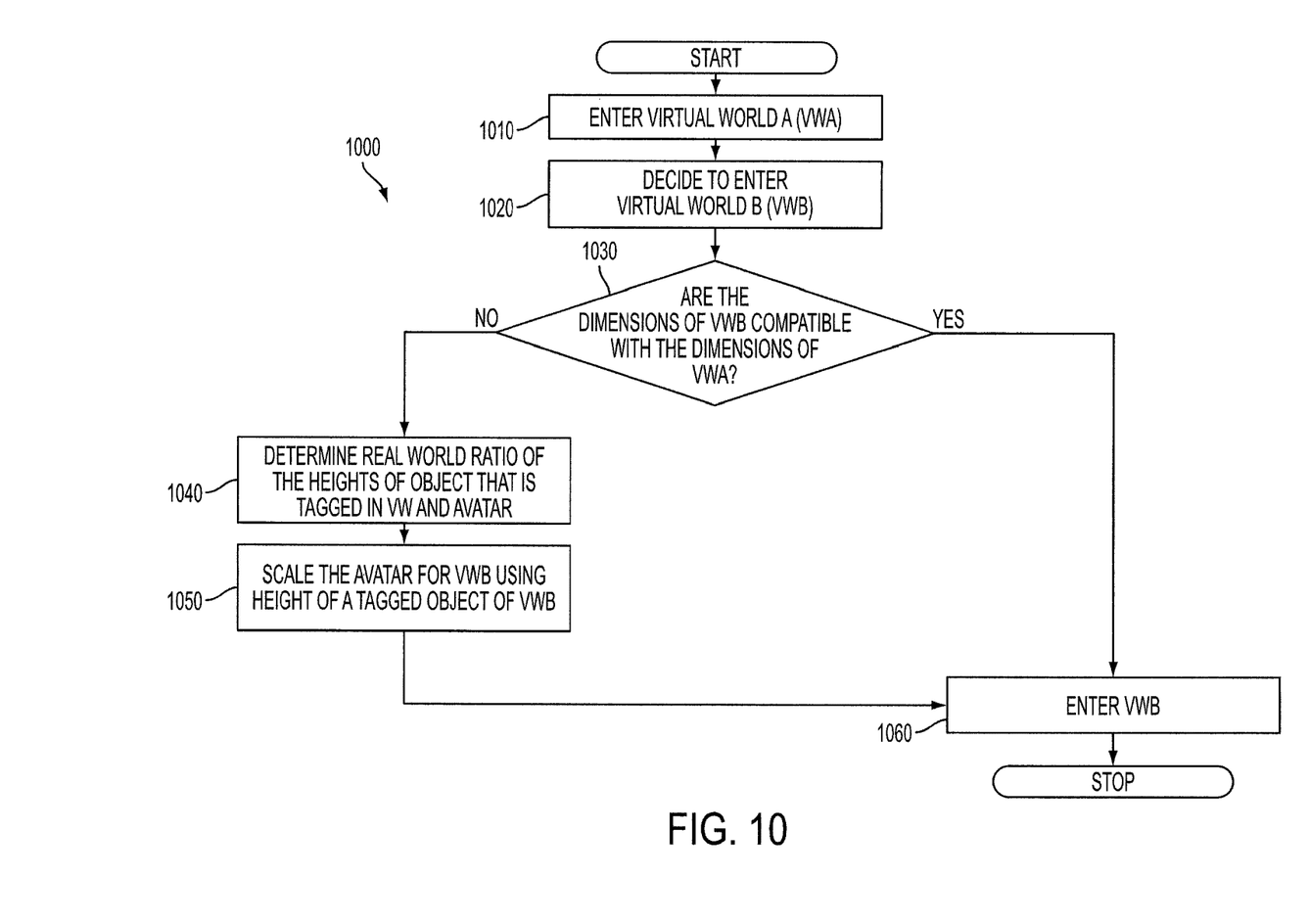
FIG. 10 illustrates a flowchart of a method for rescaling an avatar based upon real world counterparts in accordance with exemplary embodiments.

FIG. 9 diagrammatically illustrates an example 900 for rescaling an avatar based upon real world counterparts. FIG. 10 illustrates a flowchart of a method 1000 for rescaling an avatar based upon real world counterparts in accordance with exemplary embodiments. The method 100 depicts a way to map the virtual world avatar size to the real world counterpart. Using the real world counterpart as a standard, one can derive the scaling factor and size for the avatar in another virtual world. FIG. 9 illustrates an original avatar 905 in VWA, an original avatar 915 in VWB, and a tagged object (e.g., a table) in VWB. FIG. 9 further illustrates a real world depiction of an object 950 having height, s, and a real world depiction of a person 955 having height, t. In exemplary embodiments, the resulting real world objects size ratio is s:t (or t/s). According to FIG. 10, a user causes the original avatar 905 to enter VWA at block 1010. The user then decides to have the user's original avatar 905 transport to VWB at block 1020. The method 1000 then determines if the dimensions of VWB are compatible with the dimensions of VWA at block 1030. If the dimensions of VWA and VWB are compatible at block 1030, then at block 1060, the original avatar 905 enters VWB. In this case there is no scaling and the original avatar 905 remains its original height. In exemplary embodiments, the virtual worlds may include a data structure having a predetermined record that the virtual worlds are compatible for non-scaled teleportation. However, if the method 1000 determines that the dimensions of VWA and VWB are not compatible at block 1030, then scaling is implemented on the original avatar 905 in accordance with exemplary embodiments. At block 1040, the method 1000 determines the real world ratio of the heights of the a real world depiction of an object 950 that is tagged in the virtual world and the real world depiction of a person 955, which from above is s/t. At block 1050, the method 1000 scales the original avatar 905 for VWB using the height of the tagged object 920 in VWB. In exemplary embodiments, the scaled height is calculated as follows: $p=q(t/s)$, where t/s is the size ratio of real objects. At block 1060, the original avatar 905 enters VWB as the scaled avatar 915.

In exemplary embodiments, the systems and methods described herein can further include transporting/teleporting objects into a virtual world from another virtual world in which further data relating to attributes of the objects. For example, an additional data file can include data related to the attributes of the objects. As such, when the objects are transported, the objects can be rescaled in the virtual world to where the objects are transported. This type of teleportation can be achieved implementing the same methodology for auto rescaling avatars into this space as described herein. In exemplary embodiments, the teleported objects can be rescaled based on the size of other objects in the virtual world to where the objects are transported. In exemplary embodiments, the teleported objects can be rescaled based on the size of the avatars in the virtual world to where the objects are transported. In exemplary embodiments, the virtual world space can be rescaled based on the size of the object in the virtual world to where the objects are transported.

Figure 11:
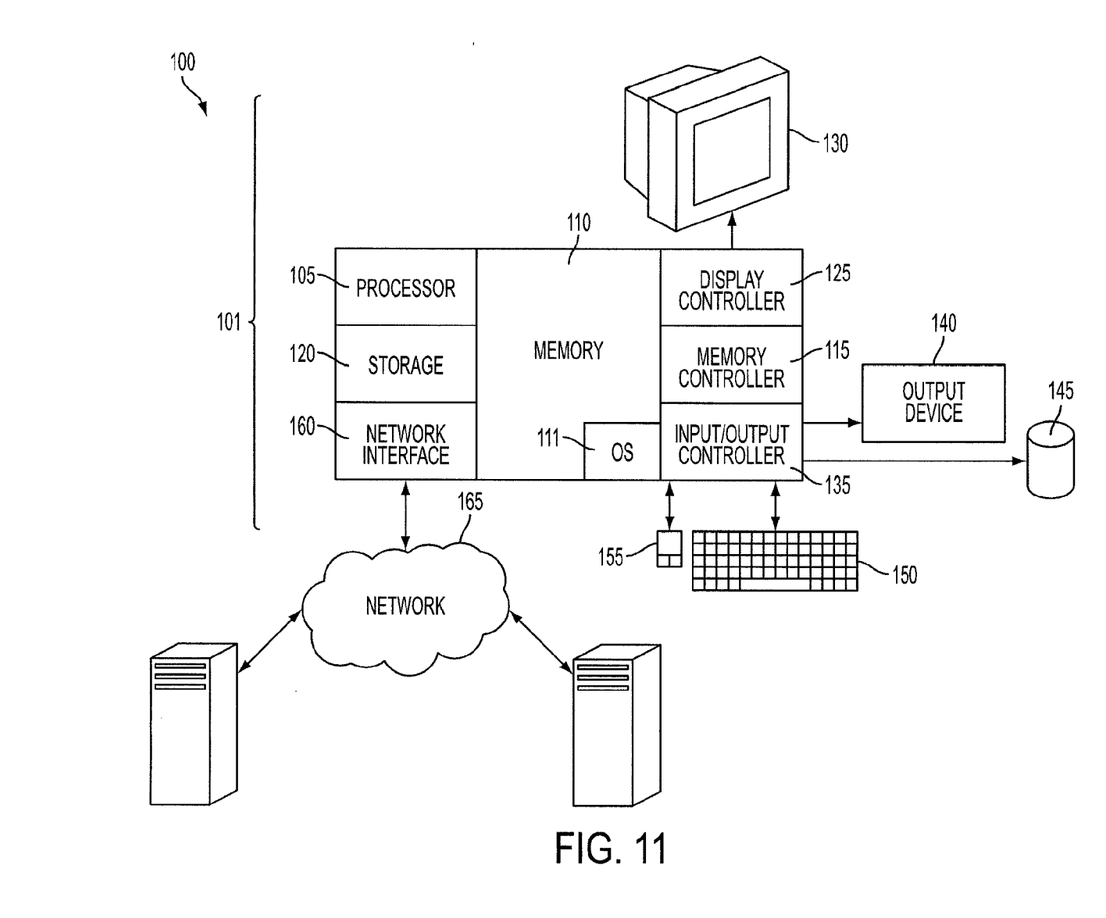
FIG. 11 illustrates an exemplary embodiment of a system for rescaling an avatar for interoperability in virtual world environments.

FIG. 11 illustrates an exemplary embodiment of a system 1100 for rescaling an avatar for interoperability in virtual world environments. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1100 therefore includes general-purpose computer 1101. The components of the general purpose computer 1101 are described herein. The system 1100 can further include servers 170, 175. The server 170 may host VWA and the server 175 may host VWB. It is understood that these are only examples and that the servers may host other virtual worlds. It is also understood that the servers can include similar components as described with respect to the general purpose computer 1101. In addition, the software components described here may exist solely on the general purpose computer 110, the server 170 or the server 175. In other exemplary embodiments, the software components described here in may be distributed over the general purpose computer 1101, and the servers 170, 175.

In exemplary embodiments, in terms of hardware architecture, as shown in FIG. 11, the computer 1101 includes a processor 1105, memory 1110 coupled to a memory controller 1115, and one or more input and/or output (I/O) devices 1140, 1145 (or peripherals) that are communicatively coupled via a local input/output controller 1135. The input/output controller 1135 can be, for example but not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1105 is a hardware device for executing software, particularly that stored in memory 1110. The processor 1105 can be any custom made or commercially available processor, a central processing unit (CPU), an auxiliary processor among several processors associated with the computer 1101, a semiconductor based microprocessor (in the form of a microchip or chip set), a macroprocessor, or generally any device for executing software instructions.

The memory 1110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1110 may incorporate electronic, magnetic, optical, and/or other types of storage media. Note that the memory 1110 can have a distributed architecture, where various components are situated remote from one another, but can be accessed by the processor 1105.

The software in memory 1110 may include one or more separate programs, each of which comprises an ordered listing of executable instructions for implementing logical functions. In the example of FIG. 11, the software in the memory 1110 includes the avatar rescaling methods described herein in accordance with exemplary embodiments and a suitable operating system (OS) 1111. The operating system 1111 essentially controls the execution of other computer programs, such the avatar rescaling systems and methods described herein, and provides scheduling, input-output control, file and data management, memory management, and communication control and related services. The software in the memory 1110 may also include applications for enabling interoperability between the virtual worlds such as VWA and VWB, including any standards and data structures for rescaling as described herein.

The avatar rescaling methods described herein may be in the form of a source program, executable program (object code), script, or any other entity comprising a set of instructions to be performed. When a source program, then the program needs to be translated via a compiler, assembler, interpreter, or the like, which may or may not be included within the memory 1110, so as to operate properly in connection with the OS 1111. Furthermore, the avatar rescaling methods can be written as an object oriented programming language, which has classes of data and methods, or a procedure programming language, which has routines, subroutines, and/or functions.

In exemplary embodiments, a conventional keyboard 1150 and mouse 1155 can be coupled to the input/output controller 1135. Other output devices such as the I/O devices 1140, 1145 may include input devices, for example but not limited to a printer, a scanner, microphone, and the like. Finally, the I/O devices 1140, 1145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1100 can further include a display controller 1125 coupled to a display 1130. In exemplary embodiments, the system 1100 can further include a network interface 1160 for coupling to a network 1165. The network 1165 can be an IP-based network for communication between the computer 1101 and any external server, client and the like via a broadband connection. The network 1165 transmits and receives data between the computer 1101 and external systems. In exemplary embodiments, network 1165 can be a managed IP network administered by a service provider. The network 1165 may be implemented in a wireless fashion, e.g., using wireless protocols and technologies, such as WiFi, WiMax, etc. The network 1165 can also be a packet-switched network such as a local area network, wide area network, metropolitan area network, Internet network, or other similar type of network environment. The network 1165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1101 is a PC, workstation, intelligent device or the like, the software in the memory 1110 may further include a basic input output system (BIOS) (omitted for simplicity). The BIOS is a set of essential software routines that initialize and test hardware at startup, start the OS 1111, and support the transfer of data among the hardware devices. The BIOS is stored in ROM so that the BIOS can be executed when the computer 1101 is activated.

When the computer 1101 is in operation, the processor 1105 is configured to execute software stored within the memory 1110, to communicate data to and from the memory 1110, and to generally control operations of the computer 1101 pursuant to the software. The avatar rescaling methods described herein and the OS 1111, in whole or in part, but typically the latter, are read by the processor 1105, perhaps buffered within the processor 1105, and then executed.

When the systems and methods described herein are implemented in software, as is shown in FIG. 11, it the methods can be stored on any computer readable medium, such as storage 1120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the avatar rescaling methods are implemented in hardware, the avatar rescaling methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Embodiments of the present invention may also be delivered as part of a service engagement with the respective operators and/or users of the virtual environments. Aspects of these embodiments may include configuring a computer system to perform, and deploying software, hardware, and web services that implement, some or all of the methods described herein. The software in these embodiments may be deployed in these embodiments using any suitable software fulfillment technique, including without limitation: (i) distributing non-rewritable storage media (e.g., CD-ROM disks readable by a CD-ROM drive or DVD-ROM disks readable by a DVD-ROM drive); (ii) storing a program on a network accessible storage media (e.g., a public web site, a public FTP site), receiving a request for the program, and transmitting the program to the requestor over the network. Additional aspects of these embodiments may include operating a public website that receives transfer instructions from the users of the virtual environments, coordinating the transfer between the virtual environments, receiving payment information for the transfer service, and providing monetary payments to the respective providers(s) of the virtual environments.

Technical effects include enabling avatar scaling interoperability between virtual worlds such that an avatar from one virtual world can seamlessly enter another virtual world at scales appropriate for the entered virtual world.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for transferring an object from a first virtual environment to a second virtual environment, the method comprising:

receiving, via a network interface, a request to copy an object associated with a first virtual environment into a second virtual environment, wherein each virtual environment is a separate computer-based simulated environment wherein multiple users interact via avatars;

determining whether dimensions of the second virtual environment are compatible with dimensions of the first virtual environment;

in response to a determination that the dimensions of the second virtual environment are not compatible with the dimensions of the first virtual environment, calculating a scale factor between the first virtual environment and the second virtual environment;

rescaling the object using the calculated scale factor; and copying the rescaled object into the second virtual environment, wherein the calculating the scale factor is based on common objects tagged in the first virtual environment and the second virtual environment, and wherein the scale factor is given by $q=n*(p/m)$, where q is a dimension of a tagged object in the second virtual environment, n is a dimension of the tagged object in the first virtual environment, p is a dimension of the avatar in the second virtual environment, and m is a dimension of the avatar in the first virtual environment.

2. The method as claimed in claim 1, wherein the first virtual environment resides on a first computer system and wherein the second virtual environment resides on the first computer system.

3. A method for transferring an object from a first virtual environment to a second virtual environment, the method comprising:
  receiving, via a network interface, a request to copy an object associated with a first virtual environment into a second virtual environment, wherein each virtual environment is a separate computer-based simulated environment wherein multiple users interact via avatars;
  determining whether dimensions of the second virtual environment are compatible with dimensions of the first virtual environment;
  in response to a determination that the dimensions of the second virtual environment are not compatible with the dimensions of the first virtual environment, calculating a scale factor between the first virtual environment and the second virtual environment;
  rescaling the object using the calculated scale factor; and
  copying the rescaled object into the second virtual environment, wherein the object comprises an avatar, wherein the calculating the scale factor is based on an average size of avatars in the first virtual environment and an average size of avatars in the second virtual environment, and wherein the scale factor is given by $p=m*(y/x)$, where p is a dimension of the avatar in the second virtual environment, m is a dimension of the avatar in the first virtual environment, y is an average dimension of avatars in the second virtual environment and x is an average dimension of avatars in the first virtual environment.

4. The method as claimed in claim 3 further comprising:
  converting a dimension of the avatar to the standard scale to generate a standardized dimension; and
  converting the standardized dimension to a dimension for the avatar in the second virtual environment.

5. The method as claimed in claim 3, wherein the first virtual environment resides on a first computer system and wherein the second virtual environment resides on the first computer system.

6. A computer program product for transferring an avatar from a first virtual environment residing on a first computer system to a second virtual environment residing on a second computer system, the computer program product including non-transitory computer readable medium having instructions stored thereon for causing the first and second computer systems to implement a method, the method comprising:
  determining whether dimensions of the second virtual environment are compatible with dimensions of the first virtual environment, wherein each virtual environment is a separate computer-based simulated environment wherein multiple users interact via avatars;
  in response to a determination that the dimensions of the second virtual environment are not compatible with the dimensions of the first virtual environment, performing an interoperability rescaling between the first virtual environment and the second virtual environment; and
  transferring the avatar from the first virtual environment to the second virtual environment, wherein the interoperability rescaling comprises rescaling the avatar based on an average size of avatars in the first virtual environment and avatars in the second virtual environment for identifying a scale factor, the scale factor determining the rescaling of the avatar, wherein the scale factor is given by $p=m*(y/x)$, where p is a dimension of the avatar in the second virtual environment, m is a dimension of the avatar in the first virtual environment, y is an average dimension of avatars in the second virtual environment and x is an average dimension of avatars in the first virtual environment.

* * * * *